(12) United States Patent
Bratt et al.

(10) Patent No.: US 9,304,926 B2
(45) Date of Patent: Apr. 5, 2016

(54) COHERENCY CONTROL MESSAGE FLOW

(71) Applicant: ARM LIMITED, Cambridge (GB)

(72) Inventors: Ian Bratt, San Jose, CA (US); Mladen Wilder, Cambridge (GB); Ole Henrik Jahren, Trondheim (NO)

(73) Assignee: ARM Limited, Cambridge (GB)

( * ) Notice: Subject to any disclaimer, the term of this patent is extended or adjusted under 35 U.S.C. 154(b) by 267 days.

(21) Appl. No.: 13/948,658

(22) Filed: Jul. 23, 2013

(65) Prior Publication Data

US 2015/0032969 A1  Jan. 29, 2015

(51) Int. Cl.
  *G06F 12/08* (2006.01)
(52) U.S. Cl.
  CPC ........ *G06F 12/0855* (2013.01); *G06F 12/0815* (2013.01); *G06F 12/0828* (2013.01); *G06F 12/0831* (2013.01)
(58) Field of Classification Search
  CPC ............ G06F 12/0855; G06F 12/0815; G06F 12/0831; G06F 12/0828; G06F 17/30348; G06F 2212/621
  USPC .................................................. 711/140, 146
  See application file for complete search history.

(56) References Cited

U.S. PATENT DOCUMENTS

| | | | |
|---|---|---|---|
| 6,378,048 B1 | 4/2002 | Prudvi et al. | |
| 6,643,741 B1 | 11/2003 | Shuf et al. | |
| 7,272,688 B1 | 9/2007 | Glasco | |
| 2003/0065843 A1 | 4/2003 | Jones et al. | |
| 2003/0196047 A1 | 10/2003 | Kessler et al. | |
| 2004/0088494 A1 | 5/2004 | Glasco et al. | |
| 2004/0123034 A1 | 6/2004 | Rogers et al. | |
| 2008/0126707 A1 | 5/2008 | Sistla | |
| 2008/0320231 A1 | 12/2008 | Kinter et al. | |
| 2009/0216957 A1 | 8/2009 | Chaussade et al. | |
| 2009/0313435 A1 | 12/2009 | Thantry et al. | |

OTHER PUBLICATIONS

International Search Report and Written Opinion of the International Searching Authority dated Sep. 15, 2014 in PCT/GB2014/051373, 13 pages.
ARM Limited, AMBA AXI™ and ACE™ Protocol Specification, Oct. 2011, pp. 1-306.

*Primary Examiner* — Jasmine Song
(74) *Attorney, Agent, or Firm* — Nixon & Vanderhye P.C.

(57) ABSTRACT

A coherent memory system includes a plurality of level 1 cache memories 6 connected via interconnect circuitry 18 to a level 2 cache memory 8. Coherency control circuitry 10 manages coherency between lines of data. Evict messages from the level 1 cache memories to the coherency control circuitry 10 are sent via the read address channel AR. Read messages are also sent via the read address channel AR. The read address channel AR is configured such that a read message may not be reordered relative to an evict message. The coherency control circuitry 10 is configured such that a read message will not be processed ahead of an evict message. The level 1 cache memories 6 do not track in-flight evict messages. No acknowledgement of an evict message is sent from the coherency control circuitry 10 back to the level 1 cache memory 6.

14 Claims, 4 Drawing Sheets

COHERENCY CONTROL MESSAGE FLOW

BACKGROUND

This invention relates to the field of data processing systems. More particularly, this invention relates to data processing systems having coherency control mechanisms for managing coherence between data stored at different locations within the data processing system.

It is known to provide data processing systems capable of storing multiple copies of the same data values at different locations within the data processing system. Thus, for example, one or more individual processors may store a local copy of a line of data within their local cache to provide more rapid access to that line of data. A problem with such an approach is that coherency must be managed across the different copies of the line of data. Thus, if one of the processors changes that line of data, then such a change may need to be communicated to the processors storing a now out-of-date copy of that line of data. Such coherency control mechanisms may include the use of snoop buffers/directories which centrally store data identifying which lines of data are stored within which locations within the system as a whole. When an event takes place which may need to be notified to different points within the system, then the snoop buffer/directory can be used to identify what, if any, copies of a given line of data are stored within different locations of the system as a whole.

One way of managing coherency control within such systems is to utilise a protocol for handling memory access requests that supports the passing of appropriate coherence management messages. An example of such a protocol is the ACE protocol developed by ARM Limited of Cambridge, England. While such an approach may ensure proper coherence, it can suffer from the disadvantage of requiring additional complexity/overhead within the devices communicating using that protocol in order to ensure compliance with the protocol. Such additional complexity may be expensive in terms of both circuit area and power consumed. Furthermore, constraints of the protocol may slow down performance and may result in requirements that do not easily scale as a system grows in size.

SUMMARY

Viewed from one aspect the present invention provides apparatus for processing data comprising:
a plurality of agents each configured to store one or more lines of data;
coherency control circuitry configured to control coherency between said lines of data stored within said plurality of agents; and
interconnect circuitry configured to provided communication between said plurality of agents and said coherency control circuitry, said interconnect circuitry providing a plurality of communication channels between each one of said plurality of agents and said coherency control circuitry; wherein
at least one of said plurality of agents is configured:
(i) to send an evict message to said coherency control circuitry when performing an eviction operation for a line of data via a given one of said plurality of communication channels; and
(ii) to send a read message to said coherency control circuitry when performing a subsequent read operation for said line of data via said given one of said plurality of communication channels;

said interconnect circuitry is configured always to communicate said evict message and said read message to said coherency control circuitry via said given one of said plurality of communication channels such that said evict message is received by said coherency control circuitry before said read message; and
said coherency control circuitry is configured always to process said evict message ahead of said read message.

The present technique recognises that one problem case in ensuring coherence management is that arising an agent (e.g. a low level cache memory) wishes to signal that it is evicting a line of data. A protocol-driven approach might force the agent to keep track of pending eviction messages it has sent to the coherency control circuitry and to defer acting upon subsequent requests relating to that line of data until a confirmation has been received from the coherency control circuitry that the eviction message has been at least received by the coherency control circuitry. In particular, if an agent issues an eviction message for a line of data and then wishes shortly thereafter to issue a read message relating to that line of data, then instead of stalling that read message pending receipt of an acknowledgement of the eviction message, the present techniques permit the read message to be issued without waiting for an acknowledgement message comprising the preceding eviction message. This may be achieved by arranging that the eviction message and the read message are sent on the same communication channel through the interconnect circuitry and that the communication channel is such that the read message cannot overtake the eviction message. Furthermore, the coherency control circuitry is configured such that it processes the eviction message ahead of the read message so that the messages cannot be reordered within the coherency control circuitry itself. By ensuring that these constraints are met, the need to wait for an acknowledgement message in relation to an eviction message can be avoided when it is desired to send a subsequent read message thereby increasing performance and reducing the overhead and complexity associated with the agent.

It will be appreciated that the multiple communication channels provided by the interconnect circuitry could take a wide variety of different forms. In some embodiments of the invention, the interconnect circuitry provides both a write address communication channel and a read address communication channel with the evict message and the read message both being sent by the read address communication channel. Reordering may be prevented within the read address communication channel (e.g. by the physical configuration of that channel in terms of busses, buffers, multiplexers etc.) such that a read message cannot overtake a preceding evict message.

It will be appreciated that the plurality of agents may take different forms depending upon the context/implementation within which the present technique is used. One form of the agent with which the present technique is well suited is that of a cache memory.

The agents may be configured to continue processing without any dependence upon any outcome of the evict message after the evict message has been sent. Thus, the agent need not track any in-flight evict messages and thereby the complexity and overhead which must be borne by the agent is reduced. This helps make the system more scalable as the number of potential in-flight evict messages increases.

A consequence of an agent not tracking in-flight evict messages is that the agent concerned may receive and respond to a subsequent snoop message for data subject to an in-flight evict message with the response to that subsequent snoop message indicating to the coherency control circuitry that the agent concerned no longer holds the data of interest.

If a delay arises in the time that the evict message arrives at the snoop control circuitry for that line of data, then the coherency control circuitry is configured to ignore that evict message. The consequence of the agent no longer tracking in-flight evict messages is that later snoop requests and responses may get back to the coherency control circuitry before the eviction message and yet this does not indicate an error and so can be safely ignored by the coherency control circuitry.

The coherency control circuitry can take a wide variety of different forms. In some forms the coherency control circuitry includes a message processing pipeline which is configured to prevent the read messages for the line of data completing before the evict message for that line of data. In this way, the read message is not able to overtake the evict message within the coherency control circuitry.

In some embodiments, the message processing pipeline may be configured to prevent the read message for the line of data entering the message processing pipeline while that message processing pipeline is processing an evict message for that line of data. This enforces the ordering requirement within the coherency control circuitry and requires relatively little overhead as the coherency control circuitry typically already includes a queue for messages to be handled.

One use case for the present technique is where the agents are local cache memories for respective processor cores (e.g. graphics shader cores) with a higher level cache memory being provided to be shared by the plurality of processing cores. The constraints upon the coherency control circuitry processing evict messages and read messages in order together with the transmission of those evict messages and read messages on the same communication path (which does not permit reordering) are such that no dependence on receipt of an acknowledgement from the coherency control circuitry is needed within the local cache memories. However, the higher level cache memory may be configured to communication with one or more further circuits (e.g. within a system-on-chip integrated circuit) and such communication with the further circuits may not meet the above constraints and accordingly may be such that an acknowledgement message will be required in relation to an evict message sent by the higher level cache memory to one or more of the further circuits.

Viewed from another aspect the present invention provides apparatus for processing data comprising:
a plurality of agent means for storing one or more lines of data;
coherency control means for controlling coherency between said lines of data stored within said plurality of agent means; and
interconnect means for providing communication between said plurality of agent means and said coherency control means, said interconnect means providing a plurality of communication channels between each one of said plurality of agent means and said coherency control means; wherein
at least one of said plurality of agent means is configured:
(i) to send an evict message to said coherency control means when performing an eviction operation for a line of data via a given one of said plurality of communication channels; and
(ii) to send a read message to said coherency control means when performing a subsequent read operation for said line of data via said given one of said plurality of communication channels;

said interconnect means is configured always to communicate said evict message and said read message to said coherency control means via said given one of said plurality of communication channels such that said evict message is received by said coherency control means before said read message; and
said coherency control means is configured always to process said evict message ahead of said read message.

Viewed from a further aspect the present invention provides a method of processing data comprising the steps of:
storing one or more lines of data within a plurality of agents;
controlling coherency between said lines of data stored within said plurality of agents using coherency control circuitry; and
providing communication between said plurality of agents and said coherency control means using a plurality of communication channels between each one of said plurality of agents and said coherency control circuitry; wherein
at least one of said plurality of agents:
(i) sends an evict message to said coherency control means when performing an eviction operation for a line of data via a given one of said plurality of communication channels; and
(ii) sends a read message to said coherency control means when performing a subsequent read operation for said line of data via said given one of said plurality of communication channels;

said interconnect circuitry always communicates said evict message and said read message to said coherency control circuitry via said given one of said plurality of communication channels such that said evict message is received by said coherency control circuitry before said read message; and
said coherency control means always processes said evict message ahead of said read message.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
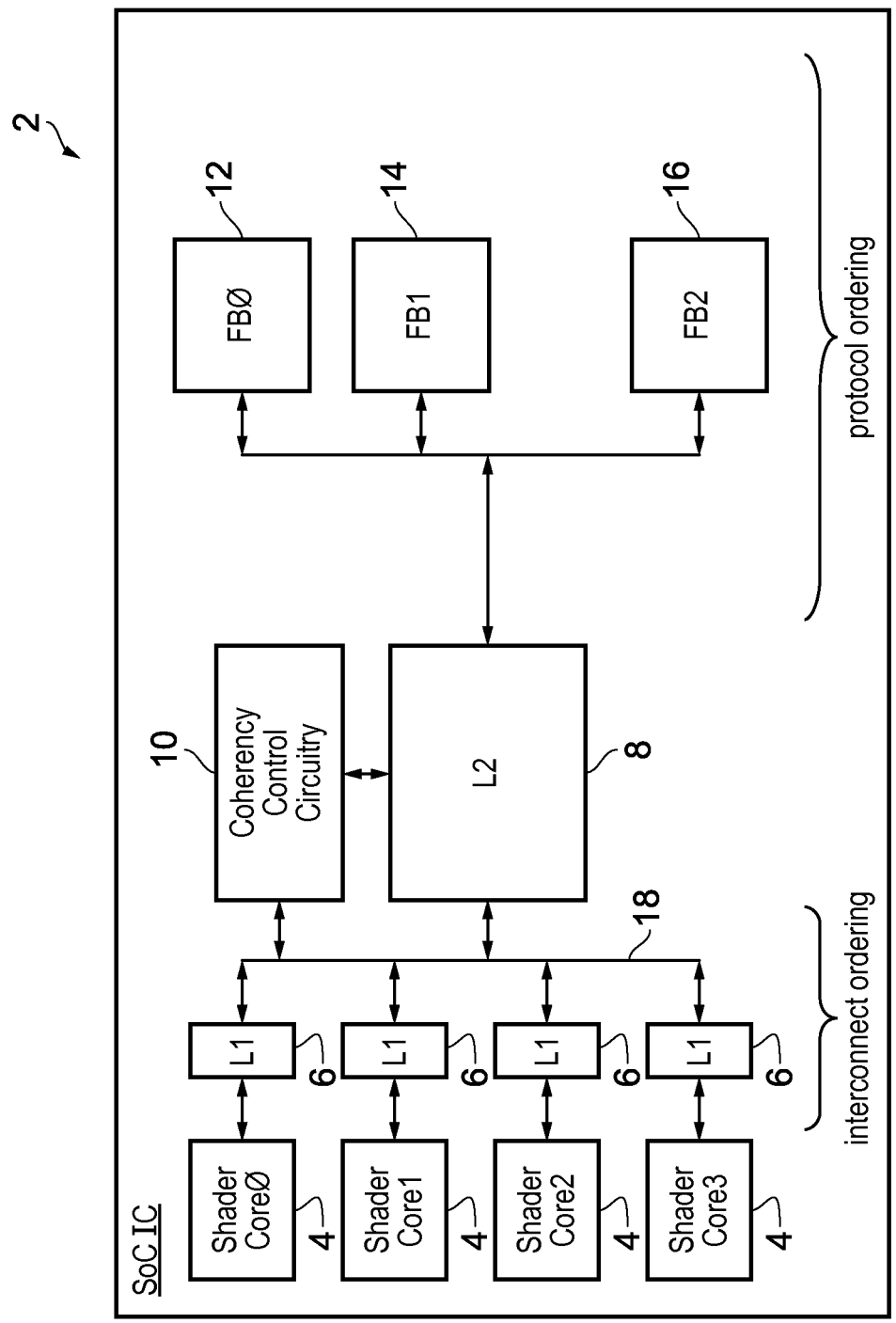
FIG. 1 schematically illustrates a system-on-chip integrated circuit employing different techniques for managing message ordering within different portions of the circuit as a whole.

FIG. 1 schematically illustrates a system-on-chip integrated circuit 2 including a plurality of graphics processing cores 4 each having a local level 1 cache memory 6. The level 1 cache memories communicate with a level 2 cache memory 8 and coherency control circuitry 10. The coherency control circuitry 10 is responsible for managing the coherence between lines of data held within the different level 1 cache memory 6 and the level 2 cache memory 8. The provision of such coherency control circuitry 10 and the protocols by which such coherency control circuitry 10 normally operates will be familiar to those in this technical field and will not be described further herein in relation to those aspects which are normal in the technical field.

The level 2 cache memory 8 is connected to one or more further functional blocks 12, 14, 16 and communicates with those further functional blocks 12, 14, 16 in accordance with a coherency communication protocol, such as the ACE compliant protocols designed by ARM Limited from Cambridge, England.

The level 1 cache memories 6 are connected to the level 2 cache memory 8 and the coherency control circuitry 10 via interconnect circuitry 18. This interconnect circuitry includes a plurality of communication channels, such as the five channel communication used in accordance with the AXI standard design by ARM Limited of Cambridge, England.

Figure 2:
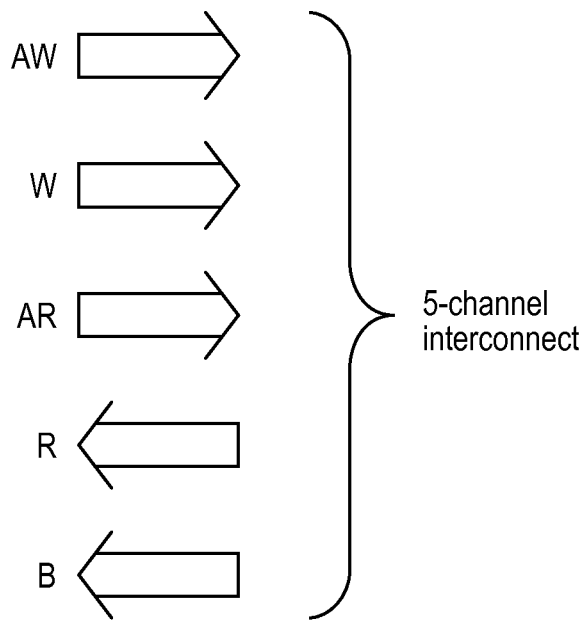
FIG. 2 is a diagram schematically illustrating the provision of multiple communication channels within interconnect circuitry.

FIG. 2 schematically illustrates an example of a plurality of communication channels which are provided by the interconnect circuitry 8. In particular, the channels may include a write address channel AW, a write data channel W, a read address channel AR, a read data channel R and a response channel B. It will be appreciated that other multi-channel communication protocols are possible and the present techniques may be applied to such different arrangements.

The interconnect circuitry 18 is schematically illustrated in FIG. 1 in the form of a simple bus, but it will be appreciated that in practice such interconnect circuitry 18 can take a wide variety of different forms which may include multiple busses, buffers, multiplexers and the like. Such interconnect circuitry 18 may support overlapping communications in different directions at the same time using different channels. The communications may take place over a extended sequence of clock cycles and multiple point-to-point communications may be supported. The present techniques may be applied to a wide variety of different forms of the interconnect circuitry. The evict message and the read message as discussed below are sent on the same communication path through the interconnect circuitry 18. The read message may not be re-ordered relative to the evict message, i.e. the read message may not overtake the evict message. This ordering by the bus may be enforced for all messages, or only for messages relating to the same line of data or an overlapping line of data.

Figure 3:
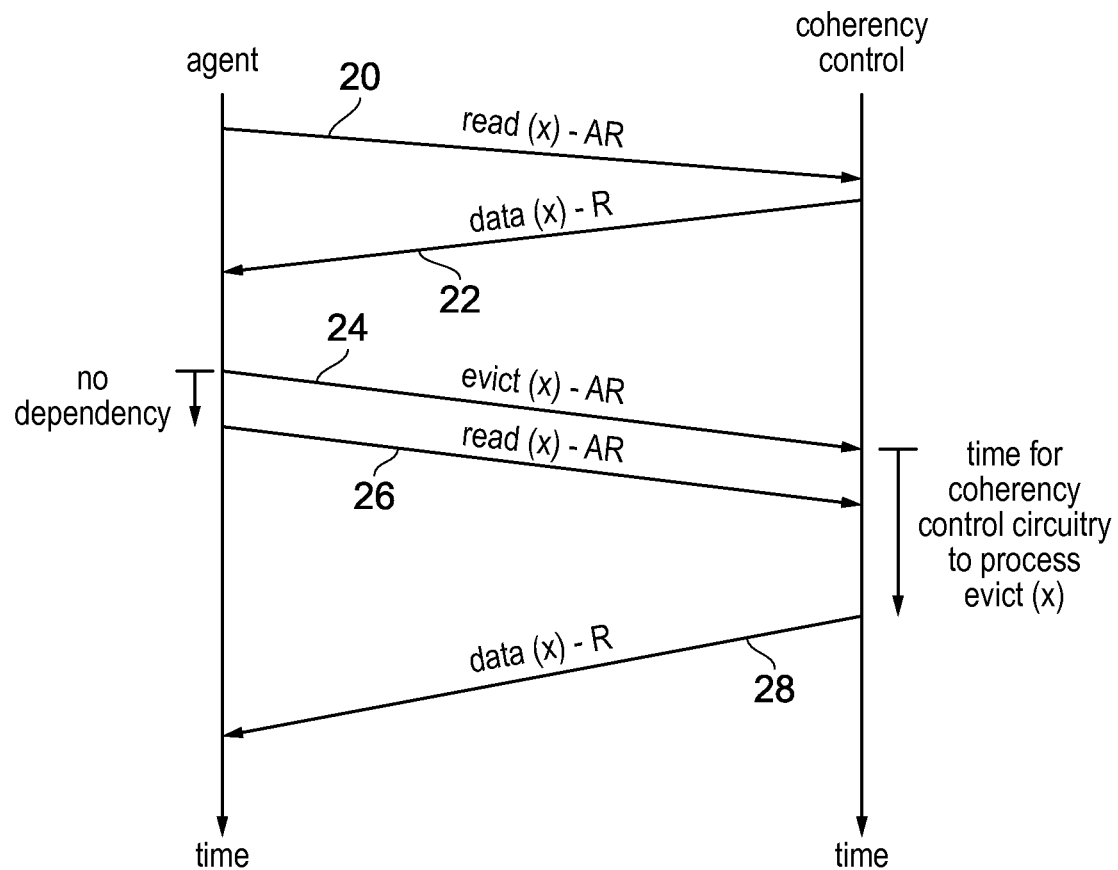
FIG. 3 is a diagram schematically illustrating the processing of a sequence of read messages, evict messages and data returns between an agent and coherency control circuitry.

FIG. 3 schematically illustrates an exchange of messages between an agent and coherency control circuitry. A read message 20 is sent via a read address channel AR from the agent to the coherency control circuitry 10. The coherency control circuitry 10 then arranges for a data message 22 to be returned via the read data channel R to the agent. At a later time, the agent sends an evict message 24 via the read address channel to the coherency control circuitry. Once the agent has sent the evict message, it no longer tracks that evict message and there is no dependency upon the status of that evict message when processing, for example, a subsequent read message. Thus, shortly after sending the evict message 24, the agent may send a read message 26 relating to that same line of data. A potential hazard is that the read message 26 could overtake the evict message 24. However, as previously discussed, in accordance with the present techniques, the evict message 24 and the read message 26 are sent on the same communication path (in this case the read address channel AR) and which is configured such that the read message 26 cannot overtake the evict message 24.

When the evict message 24 is received by the coherency control circuitry 10, the coherency control circuitry processes that evict message and ensures that processing of the received read message 28 does not get ahead (overtake) that of the evict message 24. Accordingly, the return of the data message 28 relating to the read message 26 is delayed until the processing of the evict message 24 has completed (at least in this example).

Figure 4:
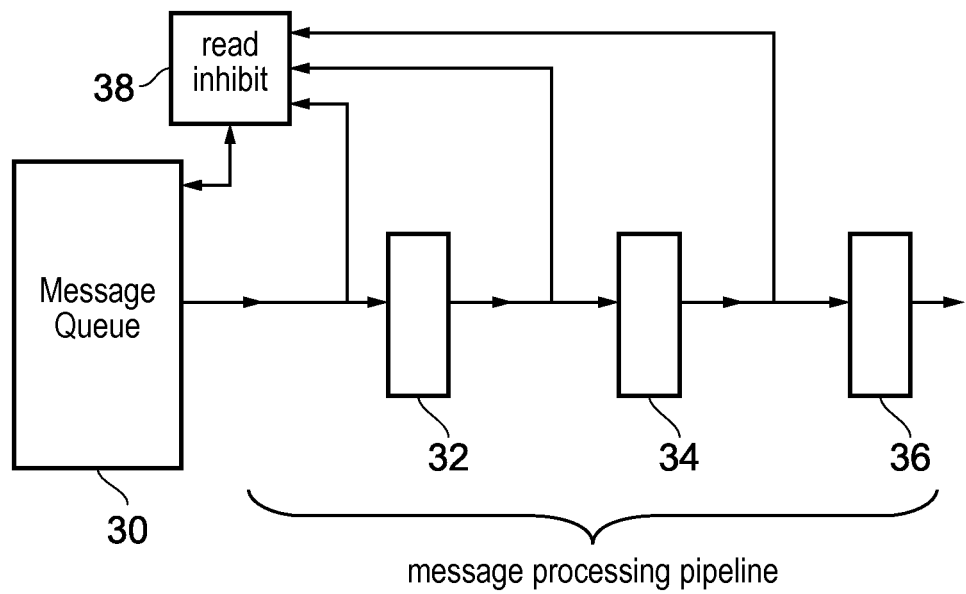
FIG. 4 schematically illustrates a message processing pipeline within coherency control circuitry.

FIG. 4 schematically illustrates a message processing pipeline within the coherency control circuitry 10. The message processing pipeline includes a message queue 30 storing messages to be issued into the first stage 32 of the message processing pipeline. If any of the processing stages 32, 34, 36 of the message processing pipeline is currently processing an evict message, then this is notified, together with the address of that evict message, to a read inhibit circuit 38. The read inhibit circuit 38 serves to prevent the issue of a read message into the read message processing pipeline if that read message shares or overlaps in address with any evict message which is currently being processed within the message processing pipeline. This mechanism ensures that the read message may not overtake an evict message within the coherency control circuitry 10.

Figure 5:
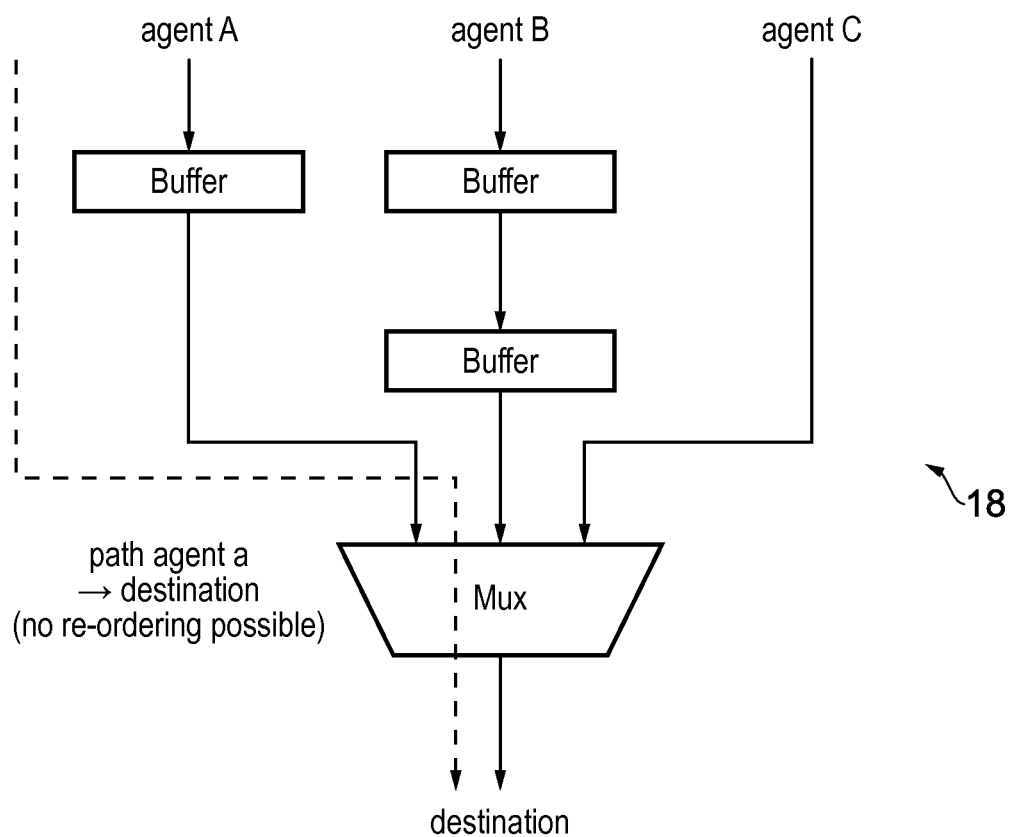
FIG. 5 schematically illustrates the structure of an interconnect including communication paths which do not permit reordering.

FIG. 5 schematically illustrates a portion of the interconnect circuitry 18. The portion of the interconnect circuitry 18 illustrated shows the read address communication paths between three different agents and a destination (such as the coherency control circuitry). The communication paths are relatively simple and include busses, latches and multiplexers. These arrangements do not permit reordering to occur within any given path. Thus, an evict message sent from one agent to the coherency control circuitry may not be reordered relative to a subsequently sent read message as the physical communication path provided does not permit such reordering to occur.

Figure 6:
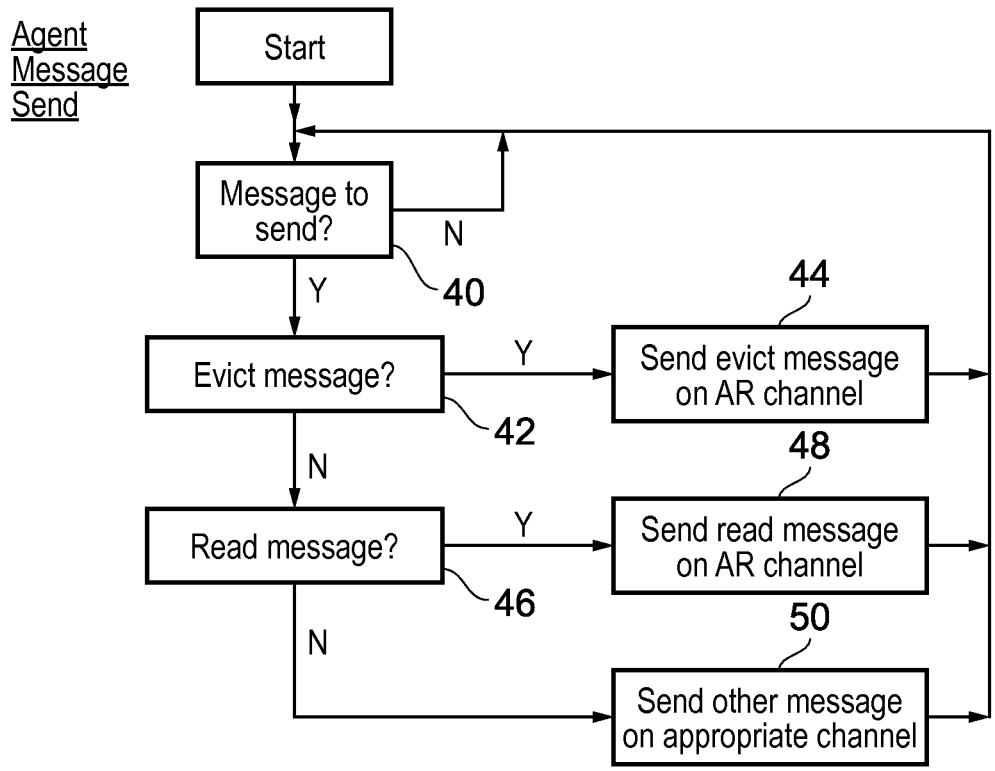
FIG. 6 is a flow diagram schematically illustrating the sending of a message by an agent.

FIG. 6 is a flow diagram schematically illustrating the control within an agent of the sending of messages. At step 40 processing waits until there is a message to send. Step 42 determines whether that message is an evict message. If the message is an evict message, then step 44 sends that evict message on the read address channel AR. If the message to send is not an evict message, then step 46 determines whether it is a read message. If the message to send is a read message, then step 48 sends this read message via the read address channel AR. If the message to send is neither an evict message nor a read message, then step 50 sends that message via the appropriate channel within the interconnect. The appropriate channel may include sending the message via the read address channel AR in some cases. FIG. 6 illustrates an example in which both evict messages and read messages are sent on the read address channel AR.

Figure 7:
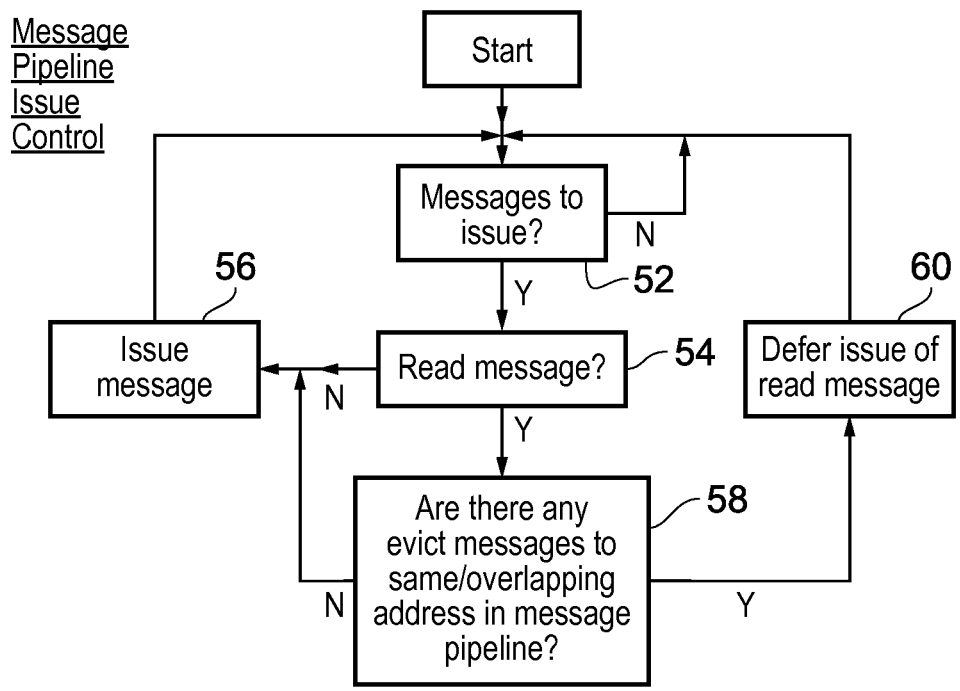
FIG. 7 is a flow diagram schematically illustrating message pipeline issue control within a message processing pipeline of the type illustrated in FIG. 4.

FIG. 7 is a flow diagram schematically illustrating issue control within the message pipeline of FIG. 4. Step 52 waits until there are messages to issue. Step 54 determines whether the message to issue is a read message. If the message to issue is not a read message, then step 56 serves to issue that message into the message pipeline (possibly subject to further constraints not illustrated). If the message to issue is a read message, then step 58 determines whether there are any evict messages to the same or an overlapping address that are already present within the message pipeline. If there are no such evict messages already present within the message pipeline, then processing again proceeds to step 56. However, if there are evict messages to the same or an overlapping address already within the message pipeline, then processing proceeds to step 60 where the read message is deferred from issue and held within the message queue 30.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   a plurality of agents each configured to store one or more lines of data;
   coherency control circuitry configured to control coherency between said lines of data stored within said plurality of agents; and
   interconnect circuitry configured to provided communication between said plurality of agents and said coherency control circuitry, said interconnect circuitry providing a plurality of communication channels between each one of said plurality of agents and said coherency control circuitry; wherein
   at least one of said plurality of agents is configured:
   (i) to send an evict message to said coherency control circuitry when performing an eviction operation for a line of data via a given one of said plurality of communication channels; and
   (ii) to send a read message to said coherency control circuitry when performing a subsequent read operation for said line of data via said given one of said plurality of communication channels;
   said interconnect circuitry is configured always to communicate said evict message and said read message to said coherency control circuitry via said given one of said plurality of communication channels such that said evict message is received by said coherency control circuitry before said read message; and
   said coherency control circuitry is configured always to process said evict message ahead of said read message.

2. Apparatus as claimed in claim 1, wherein said interconnect circuitry provides a write address communication channel and a read address communication channel and said evict message and said read message are both sent via said read address communication channel.

3. Apparatus as claimed in claim 1, wherein said plurality of agents comprises a plurality of cache memories.

4. Apparatus as claimed in claim 1, wherein said at least one of said plurality of agents is configured to continue processing without any dependency upon an outcome of said evict message after said evict message is sent.

5. Apparatus as claimed in claim 4, wherein said at least one of said plurality of agents is configured to respond to a further request for said line of data received from said coherency control circuitry without any dependency upon said outcome.

6. Apparatus as claimed in claim 4, wherein said coherency control circuitry is configured to ignore said evict message received from said at least one of said plurality of agents if said coherency control circuitry holds no data indicating that said least one of said plurality of agents is storing said line of data.

7. Apparatus as claimed in claim 1, wherein said coherency control circuitry comprises a message processing pipeline and said message processing pipeline is configured to prevent said read message for said line of data completing before said evict message for said line of data.

8. Apparatus as claimed in claim 7, wherein said message processing pipeline is configured to prevent said read message for said line of data entering said message processing pipeline while said message processing pipeline is processing said evict message for said line of data.

9. Apparatus as claimed in claim 1, wherein said given one of said plurality of communication channels comprises one of more buses, one or buffer stages and one or more multiplexers configured such that said evict message cannot be reordered relative to said read message.

10. Apparatus as claimed in claim 3, comprising a plurality of processing cores each coupled to a respective one of said plurality of cache memories and said coherency control circuitry is coupled to a higher level cache memory shared by said plurality of processing cores.

11. Apparatus as claimed in claim 10, wherein said higher level cache memory is coupled to one or more further circuit units using a communication protocol in accordance with which, if said higher level cache memory sends further evict message relating to a further line of data to one of said one or more further circuits, then said higher level cache memory is configured to wait for an acknowledge message for said further evict message to be received from said one of said one or more further circuits before processing a further request for said further line of data.

12. Apparatus as claimed in claim 10, wherein said plurality of processing cores comprise a plurality of graphics shader cores.

13. Apparatus for processing data comprising:
    a plurality of agent means for storing one or more lines of data;
    coherency control means for controlling coherency between said lines of data stored within said plurality of agent means; and
    interconnect means for providing communication between said plurality of agent means and said coherency control means, said interconnect means providing a plurality of communication channels between each one of said plurality of agent means and said coherency control means; wherein
    at least one of said plurality of agent means is configured:
    (i) to send an evict message to said coherency control means when performing an eviction operation for a line of data via a given one of said plurality of communication channels; and
    (ii) to send a read message to said coherency control means when performing a subsequent read operation for said line of data via said given one of said plurality of communication channels;
    said interconnect means is configured always to communicate said evict message and said read message to said coherency control means via said given one of said plurality of communication channels such that said evict message is received by said coherency control means before said read message; and
    said coherency control means is configured always to process said evict message ahead of said read message.

14. A method of processing data comprising the steps of:
    storing one or more lines of data within a plurality of agents;
    controlling coherency between said lines of data stored within said plurality of agents using coherency control circuitry; and
    providing communication between said plurality of agents and said coherency control circuitry using a plurality of communication channels between each one of said plurality of agents and said coherency control circuitry; wherein at least one of said plurality of agents:
- (i) sends an evict message to said coherency control circuitry when performing an eviction operation for a line of data via a given one of said plurality of communication channels; and
- (ii) sends a read message to said coherency control circuitry when performing a subsequent read operation for said line of data via said given one of said plurality of communication channels;

said interconnect circuitry always communicates said evict message and said read message to said coherency control circuitry via said given one of said plurality of communication channels such that said evict message is received by said coherency control circuitry before said read message; and said coherency control circuitry always processes said evict message ahead of said read message.

* * * * *